United States Patent
Sakurai et al.

(10) Patent No.: US 9,389,445 B2
(45) Date of Patent: Jul. 12, 2016

(54) ELECTRO-OPTIC DEVICE AND ELECTRONIC APPARATUS

(75) Inventors: Shinji Sakurai, Azumino (JP); Shoji Hinata, Azumino (JP)

(73) Assignee: Japan Display Inc., Tokyo (JP)

( * ) Notice: Subject to any disclaimer, the term of this patent is extended or adjusted under 35 U.S.C. 154(b) by 1433 days.

(21) Appl. No.: 12/044,121

(22) Filed: Mar. 7, 2008

(65) Prior Publication Data

US 2008/0220184 A1 Sep. 11, 2008

(30) Foreign Application Priority Data

Mar. 8, 2007 (JP) ................................. 2007-058169
Oct. 16, 2007 (JP) ................................. 2007-268672

(51) Int. Cl.
*G02F 1/1333* (2006.01)

(52) U.S. Cl.
CPC ...... *G02F 1/133308* (2013.01); *G02F 1/13338* (2013.01); *G02F 2001/133311* (2013.01); *G02F 2201/50* (2013.01); *G02F 2201/503* (2013.01); *G02F 2202/28* (2013.01); *Y10T 428/1064* (2015.01)

(58) Field of Classification Search
None
See application file for complete search history.

(56) References Cited

U.S. PATENT DOCUMENTS

| 7,811,669 | B2 * | 10/2010 | Fujii et al. | 428/451 |
| 2001/0000961 | A1 * | 5/2001 | Hikida et al. | 345/173 |
| 2002/0054261 | A1 * | 5/2002 | Sekiguchi | 349/122 |
| 2007/0026168 | A1 * | 2/2007 | Kishimoto et al. | 428/1.6 |
| 2009/0078371 | A1 * | 3/2009 | Shimizu et al. | 156/344 |

FOREIGN PATENT DOCUMENTS

| JP | 02-194944 | | 8/1990 | |
| JP | 09123334 A | * | 5/1997 | ............... B32B 9/00 |
| JP | 09-318932 | | 12/1997 | |
| JP | 2002-174809 | | 6/2002 | |
| JP | 2003260749 | | 9/2003 | |
| JP | 2004-101636 | | 4/2004 | |
| JP | 2005-114820 | | 4/2005 | |
| JP | 2006-116829 | | 5/2006 | |
| JP | 2006-290960 | | 10/2006 | |
| JP | 2007-018431 | | 1/2007 | |
| TW | 200510177 | | 3/2005 | |
| TW | 200638791 | * | 11/2006 | |
| WO | WO 2006098138 A1 | * | 9/2006 | |

OTHER PUBLICATIONS

JP 2002-174809, Tamura et. al., machine translation (2002).*
"Touch Screen", Illustrated Dictionary of Electronics, Gibilisco, McGraw-Hill Professional, New York (2001).*
English machine translation of JP09123334A from IPDL of the Japanese Patent Office (1997).*
English Abstract of TW 200638791.*
Korean Office Action issued Dec. 11, 2009 in corresponding Korean Application No. 10-2008-0020854.
Taiwanese Office Action issued Sep. 26, 2011 in corresponding Taiwanese Application No. 097108095.

* cited by examiner

*Primary Examiner* — Kenneth Stachel
(74) *Attorney, Agent, or Firm* — K&L Gates LLP

(57) ABSTRACT

An electro-optic device includes an electro-optic panel, a transparent protective member disposed at a viewer side of the electro-optic panel, an adhesive provided between the electro-optic panel and the transparent protective member, and a gas barrier film provided on a surface of the transparent protective member at a side opposite to the viewer side.

3 Claims, 5 Drawing Sheets

FIG. 5

| | WITHOUT GAS BARRIER FILM | WITH GAS BARRIER FILM (THREE LAYERS) | WITH GAS BARRIER FILM (TWO LAYERS) |
|---|---|---|---|
| $CO_2$ | 46.4 | 7.9 | 8.75 |
| $N_2$ | 23.6 | 8.75 | 8.14 |
| $O_2$ | 87.5 | 15.8 | 33.3 |
| TOTAL | 157.5 | 32.45 | 50.19 |

ELECTRO-OPTIC DEVICE AND ELECTRONIC APPARATUS

The entire disclosure of Japanese Patent Application Nos. 2007-058169, filed Mar. 8, 2007 and 2007-268672, filed Oct. 16, 2007 are expressly incorporated by reference herein.

BACKGROUND

1. Technical Field

The present invention relates to electro-optic devices and electronic apparatuses, in particular, an electro-optic device having a transparent protective member and an electronic apparatus including the electro-optic device.

2. Related Art

As electro-optic devices, display devices such as liquid crystal display devices, organic luminescence display devices, and plasma display devices have been known. In these display devices, protective plates composed of plastic are used to provide protection against impact. For example, a protective plate is bonded to a display panel using an adhesive sheet (see Japanese Unexamined Patent Application Publication No. 2006-290960).

The display devices are also used as electronic apparatuses such as cellular phones. That is, the display devices are used in various different environments. For example, cellular phones may be left in high-temperature environment, such as cars under boiling sun.

If the protective plate is composed of plastic that absorbs gas, such as air containing carbon dioxide, nitrogen, etc., the plastic may release the gas absorbed therein when exposed to a high-temperature environment. If this occurs, the gas released from the protective plate may remain as bubbles between the adhesive sheet and the protective plate.

The bubbles between the adhesive sheet and the protective plate appear as mottles, islands, etc., on a display face of a display panel. As a result, the appearance of the display face of the liquid display device is degraded. Moreover, the bubbles that appear as mottles may decrease the visibility of the images displayed in the display panel.

SUMMARY

An advantage of some aspects of the invention is that the invention provides an electro-optic device in which degradation of appearance by gas generated from a protective member of a display panel is suppressed and an electronic apparatus incorporating such an electro-optic device.

According to one aspect of the invention, an electro-optic device includes an electro-optic panel, a transparent protective member disposed at a viewer side of the electro-optic panel, an adhesive provided between the electro-optic panel and the transparent protective member, and a gas barrier film provided on a surface of the transparent protective member at a side opposite to the viewer side.

According to this structure, degradation in appearance of the display face caused by gas released from the protective member for protecting the display panel can be suppressed.

The gas barrier film may be an inorganic film since generation of bubbles can be suppressed by the inorganic film.

The inorganic film preferably includes one silicon oxide layer and one aluminum oxide layer since generation of bubbles can be more reliably suppressed.

Alternatively, the inorganic film may include two silicon oxide layers since generation of bubbles can be more reliably suppressed.

Alternatively, the inorganic film may include two silicon oxide films and one aluminum oxide film since generation of bubbles can be more reliably suppressed.

Preferably, the aluminum layer is in contact with the transparent protective member and any one of the two silicon oxide films since generation of bubbles can be more reliably suppressed.

Preferably, one of the two silicon oxide films is a silicon dioxide film and is disposed at the electro-optic-panel-side, and the other is a silicon monoxide film since generation of bubbles can be more reliably suppressed.

Preferably, the electro-optic device further includes a touch-sensitive panel provided between the electro-optic panel and the transparent protective member. Preferably, the touch-sensitive panel is fixed to the transparent protective member with the gas barrier film and the adhesive therebetween. With this structure, degradation of appearance of display phase caused by gas released from the protective member for protecting display panel can be suppressed even when the touch-sensitive panel is provided.

Another aspect of the invention provides an electronic apparatus incorporating the electro-optic device described above. According to this aspect, an electronic apparatus in which degradation of appearance caused by gas released from the protective member for protecting the display panel is suppressed can be obtained.

BRIEF DESCRIPTION OF THE DRAWINGS

The invention will be described with reference to the accompanying drawings, wherein like numbers reference like elements.

FIG. 5 is a graph showing the experimental data of permeability when the gas barrier film is formed.

DESCRIPTION OF EXEMPLARY EMBODIMENTS

The embodiments of the invention will now be described with reference to the drawings.

Structure

Figure 1:
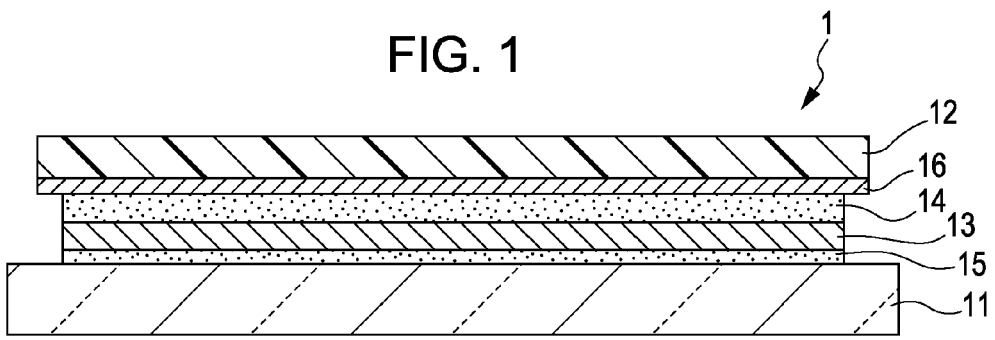
FIG. 1 is a diagram showing a structure of a liquid crystal display device according to on embodiment.

A structure of an electro-optic device according to one embodiment is first described with reference to FIG. 1. FIG. 1 is a diagram showing a structure of a liquid crystal display device of this embodiment. In the description below, this embodiment is described by taking a liquid crystal display device as one example of the electro-optic device.

In FIG. 1, a liquid crystal display device 1 includes a display panel 11, which is an electro-optic panel, a cover 12, which is a transparent protective member, and a polarizer 13. The display panel 11 includes a glass transparent substrate as an image display face, and the polarizer 13 is bonded on the surface of the glass transparent substrate with a layer of a transparent adhesive 15 therebetween. On a surface of the polarizer 13 remote from the display panel 11, the cover 12 is provided with a layer of a transparent adhesive 14 and a gas barrier film 16 therebetween. In other words, the gas barrier film 16 is provided on the back of the cover 12.

The display panel 11 includes a liquid crystal layer inside. An electrical field is applied to the liquid crystal layer to control transmission of light so that an image can be formed by the transmitted or reflected light. In particular, the display panel 11 includes two transparent substrates, a liquid crystal layer, i.e., electro-optic material layer, disposed between the two transparent substrates, and a plurality of electrodes on the surfaces of the two substrates facing each other. The regions at which the electrodes intersect each other in a plan view function as pixels. The display mode of each pixel can be independently controlled to thereby form an image in the display.

As shown in FIG. 1, in the liquid crystal display device 1, the polarizer 13 is stacked on the display panel 11 using the transparent adhesive 15, and the transparent adhesive 14 is stacked on the polarizer 13 using the transparent adhesive 14 with the gas barrier film 16 therebetween.

This liquid crystal display device 1 is placed inside the casing of an electronic apparatus so that a user can see the image displayed by the display panel 11 from the cover-12-side, i.e., the viewer's side. The cover 12 serving as a protective member for protecting the device from the impact or the like is a plastic plate and has a thickness of about 0.2 mm to 2 mm. Examples of the material of the cover 12 include polymethyl methacrylate (PMMA), polycarbonate, a polycarbonate/PMMA composite material, and CR 39.

The front surface (viewer's side) and the back surface of the polarizer 13 are respectively bonded to the transparent adhesives 14 and 15 in a sheet form. The transparent adhesives 14 and 15 are transparent gel sheets and composed of one or a combination of an acrylic resin, a silicone resin, and an epoxy resin.

The polarizer 13 has a thickness of 100 μm, for example. The transparent adhesive 14 at the cover-12-side of the polarizer 13 has a thickness of 25 μm to 400 μm, and the transparent adhesive 15 at the display-panel-11-side has a thickness of 25 μm to 50 μm.

The polarizer 13 has a three-layer structure, for example. The three layers are two triacetyl cellulose (TAC) layers and one polyvinyl alcohol (PVA) layer disposed between the TAC layers.

The gas barrier film 16 is formed on the transparent-adhesive-14-side of the cover 12 by vapor deposition, application, ion-beam deposition, sputtering, chemical vapor deposition (CVD), or the like. When the gas barrier film 16 is composed of silicon oxide as described below, the thickness of the gas barrier film 16 is 200 nm.

The gas barrier film 16 prevents generation of gas from the cover 12 in a high-temperature atmosphere such as inside a car. In this manner, degradation in appearance of the display face resulting from bubbles generated from the polarizer 13 and remaining in the transparent adhesives 14 and 15 can be suppressed.

Figure 2:
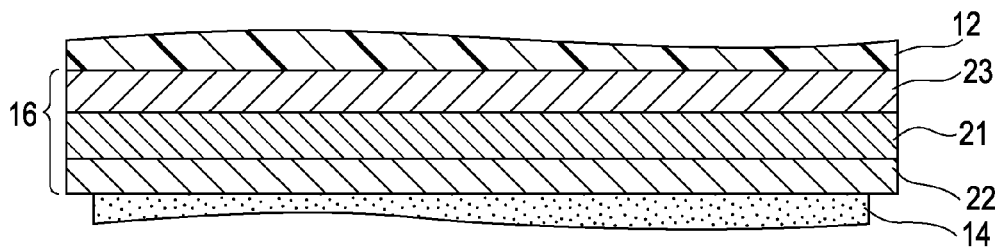
FIG. 2 is a diagram showing a structure of a gas barrier film of the embodiment.

FIG. 2 is a diagram showing a structure of the gas barrier film 16. The gas barrier film 16 is an inorganic film having a three-layer structure. For example, the gas barrier film 16 is a film constituted from a silicon monoxide (SiO) layer 21, a silicon dioxide ($SiO_2$) layer 22, and an alumina ($Al_2O_3$) layer 23. In such a case, the silicon dioxide ($SiO_2$) layer 22 is disposed at the transparent-adhesive-14-side, the alumina ($Al_2O_3$) layer 23 is disposed at the cover-12-side, and the silicon monoxide (SiO) layer 21 is disposed between the alumina ($Al_2O_3$) layer 23 and the silicon dioxide ($SiO_2$) layer 22. In other words, the alumina ($Al_2O_3$) layer 23, the silicon monoxide (SiO) layer 21, and the silicon dioxide ($SiO_2$) layer 22 are disposed in that order from the cover-12-side.

In the case where this three-layer structure is employed, the thicknesses of the alumina ($Al_2O_3$) layer 23, the silicon monoxide (SiO) layer 21, and the silicon dioxide ($SiO_2$) layer 22 are 25 nm to 45 nm, 15 nm to 45 nm, and 100 nm to 150 nm, respectively. The optimum thickness of the alumina ($Al_2O_3$) layer 23 is 30 nm, the optimum thickness of the silicon monoxide (SiO) layer 21 is 30 nm, and the optimum thickness of the silicon dioxide ($SiO_2$) layer 22 is 130 nm.

Figure 3:
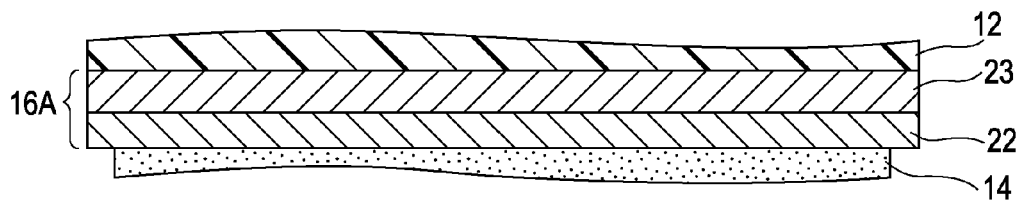
FIG. 3 is a diagram showing another structure of a gas barrier film according to the embodiment.

The gas barrier film 16 may have any suitable structure instead of the structure shown in FIG. 2. FIG. 3 is a diagram showing another structure of the gas barrier film 16.

As shown in FIG. 3, a gas barrier film 16A is an inorganic film having a two-layer structure. The two-layer structure includes the alumina ($Al_2O_3$) layer 23 and the silicon dioxide ($SiO_2$) layer 22 in that order as viewed from the cover-12-side. Alternatively, the two-layer structure may include the alumina ($Al_2O_3$) layer 23 and the silicon monoxide (SiO) layer 21 in that order as viewed from the cover-12-side. Yet alternatively, the two-layer structure may include the silicon monoxide (SiO) layer 21 and the silicon dioxide ($SiO_2$) layer 22 in that order as viewed from the cover-12-side.

The thickness of the layers in the two-layer structure differs depending on the combination.

In the case where the two-layer structure includes the alumina ($Al_2O_3$) layer 23 and the silicon dioxide ($SiO_2$) layer 22, the thicknesses of the alumina ($Al_2O_3$) layer 23 and the silicon dioxide ($SiO_2$) layer 22 are 25 nm to 45 nm and 100 nm to 150 nm, respectively. The optimum thickness of the alumina ($Al_2O_3$) layer 23 is 30 nm, and the optimum thickness of the silicon dioxide ($SiO_2$) layer 22 is 130 nm.

In the case where the two-layer structure includes the alumina ($Al_2O_3$) layer 23 and the silicon monoxide (SiO) layer 21, the thicknesses of the alumina ($Al_2O_3$) layer 23 and the silicon monoxide (SiO) layer 21 are 25 nm to 45 nm and 15 nm to 45 nm, respectively. The optimum thickness of the alumina ($Al_2O_3$) layer 23 is 30 nm, and the optimum thickness of the silicon monoxide (SiO) layer 21 is 30 nm.

In the case where the two-layer structure includes the silicon monoxide (SiO) layer 21 and the silicon dioxide ($SiO_2$) layer 22, the thicknesses of the silicon monoxide (SiO) layer 21 and the silicon dioxide ($SiO_2$) layer 22 are 45 nm to 95 nm and 100 nm to 150 nm, respectively. The optimum thickness of the silicon monoxide (SiO) layer 21 is 70 nm, and the optimum thickness of the silicon dioxide ($SiO_2$) layer 22 is 130 nm.

Alternatively, the gas barrier film 16 may be an inorganic film having a single-layer structure. An example thereof is shown in FIG. 4.

Figure 4:
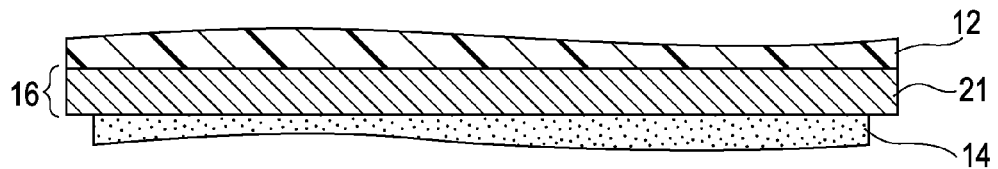
FIG. 4 is a diagram showing another structure of a gas barrier film according to the embodiment.

As shown in FIG. 4, the inorganic film having a single-layer structure is the silicon monoxide (SiO) layer 21. Alternatively, the inorganic film having the single-layer structure may be the alumina ($Al_2O_3$) layer 23 or the silicon dioxide ($SiO_2$) layer 22.

In the case where the gas barrier film 16 has a single-layer structure, the thickness of the film differs depending on the method of forming the film. Four different cases can be conceived.

In a first case where the silicon monoxide (SiO) layer 21 is formed by vapor deposition or application, the film thickness is 45 nm to 95 nm and most preferably 70 nm.

In a second case where the alumina ($Al_2O_3$) layer 23 is formed by vapor deposition or application, the film thickness is 25 nm to 45 nm and most preferably 30 nm.

In a third case where the silicon dioxide ($SiO_2$) layer 22 is formed by ion beam deposition, the film thickness is 150 nm to 250 nm and most preferably 200 nm.

In a fourth case where the silicon dioxide ($SiO_2$) layer 22 is formed by sputtering, the film thickness is 50 nm to 150 nm, and most preferably 100 nm.

Alternatively, the gas barrier film 16 may be an organic film. For example, an epoxy resin single-layer film may be used as the gas barrier film 16. Other examples of the organic film include parylene and silicone single-layer films. In forming the gas barrier film 16 using an epoxy resin, the application technique is used. In this case, the thickness of the gas barrier film 16 is several micrometers.

Furthermore, designs are printed on the surface of the gas barrier film 16.

The gas permeability of the gas barrier films 16 and 16A will now be described with reference to the experimental results shown in FIG. 5.

FIG. 5 is a table showing the experimental data of permeability of two samples with gas barrier films (three-layer film and two-layer film) and a sample without any gas barrier film. In this experiment, the thickness of each layer is as follows. In the sample with a three-layer gas barrier film, the thickness of the silicon monoxide (SiO) layer 21 is 30 nm, the thickness of alumina ($Al_2O_3$) layer 23 is 30 nm, and the thickness of the silicon dioxide ($SiO_2$) layer 22 is 130 nm. In the sample with a two-layer gas barrier film, the thickness of the silicon monoxide (SiO) layer 21 is 70 nm and the thickness of the silicon dioxide ($SiO_2$) layer 22 is 130 nm.

In the top row of the table of FIG. 5, three cases are indicated, i.e., a case where no gas barrier film is formed, a case where a three-layer gas barrier film is formed (refer to FIG. 2), and a case where a two-layer gas barrier film is formed (refer to FIG. 3). The permeability in these cases with gasses such as carbon dioxide ($CO_2$), nitrogen ($N_2$), and oxygen ($O_2$), is respectively indicated in the corresponding columns. In the bottom row, the total permeability of three types of gas is indicated.

The permeability is measured by a differential pressure method with a gas permeability meter under an experimental pressure of about 760 mmHg at a measurement temperature of 80° C. with a permeation area of 38 $cm^2$. The unit of the permeability is $cm^3/m^2 \cdot 24$ h·atm.

According to the experimental results, the permeability was lowest with the three-layer gas barrier film, i.e., the permeability with respect to the total (157.5) observed in the case where no gas barrier film was provided was about 20% (=32.45/157.5). In the case where the two-layer gas barrier film was provided, the permeability with respect to the total observed in the case where no gas barrier film was provided was about 32% (=50.19/157.5). In the case where a single-layer gas barrier film was provided, the permeability was about the same as that in the case where the two-layer gas barrier film was used.

Although not shown in the drawings, a combination of a cover 12 composed of a PMMA/polycarbonate composite material, a three-layer gas barrier film 16, and a transparent adhesive 14 composed of an acrylic resin is preferable since the permeability is low.

A combination of a cover 12 composed of polycarbonate, a gas barrier film 16 having a two-layer structure, and a transparent adhesive 14 composed of an epoxy resin is also preferable since the permeability is low.

Production Method

Figure 6:
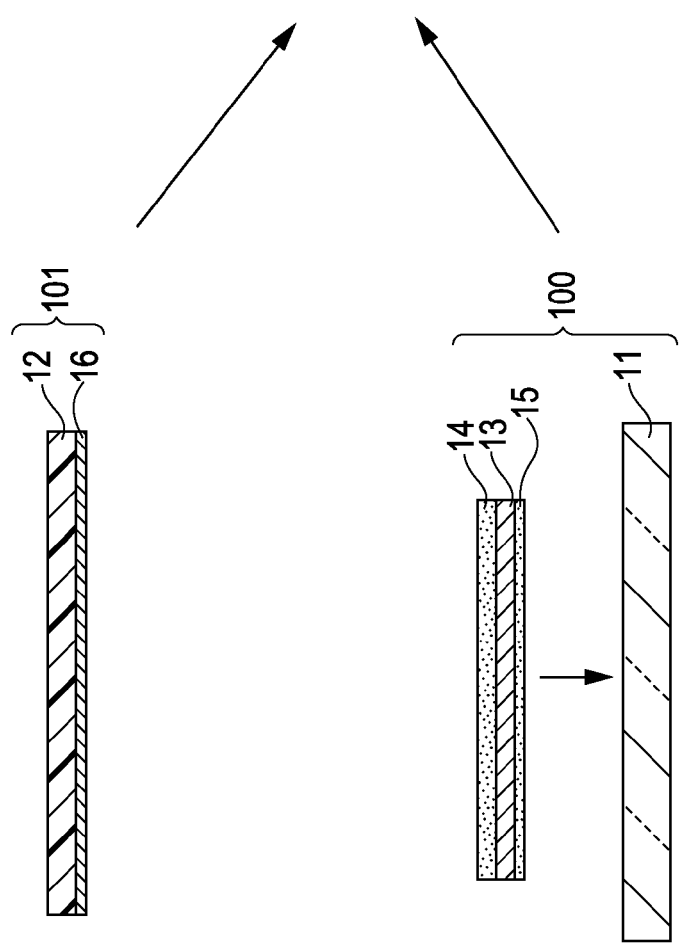
FIG. 6 is a diagram illustrating a method for forming a liquid crystal display device of another embodiment.

FIG. 6 is a diagram for illustrating a method for producing the liquid crystal display device 1 shown in FIG. 1. First, the transparent adhesives 14 and 15 in a sheet form are respectively bonded on the front surface and back surface of the polarizer 13. The polarizer 13 with the transparent adhesives 14 and 15 bonded thereto is then cut to a size of one liquid crystal display device 1.

A unit 100 including the display panel 11 and the polarizer 13 bonded on the display panel 11 is made so that the transparent adhesive 15 adheres on the surface of the display panel 11.

The cover 12 is initially formed as a large board. The gas barrier film 16 is formed on one surface of the cover 12 as the large board by application or sputtering. The cover 12 as the large board with the gas barrier film 16 thereon is cut to make a unit 101 having a size suitable for bonding with one display panel 11.

The units 100 and 101 are then bonded to each other under pressure so that the gas barrier film 16 adheres to the transparent adhesive 14 to form the liquid crystal display device 1 shown in FIG. 1. Alternatively, the bonding may be performed under pressure and heating.

Yet alternatively, the units 100 and 101 may be bonded to each other in vacuum so that the gas barrier film 16 adheres to the transparent adhesive 14 to thereby form the liquid crystal display device 1.

Modifications

Figure 7:
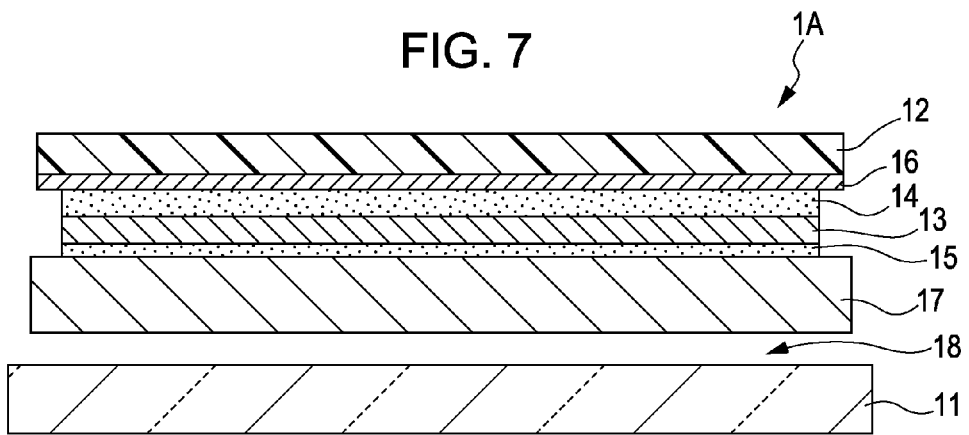
FIG. 7 is a diagram showing an example of a structure of a liquid crystal display device incorporating a touch-sensitive panel.
Figure 8:
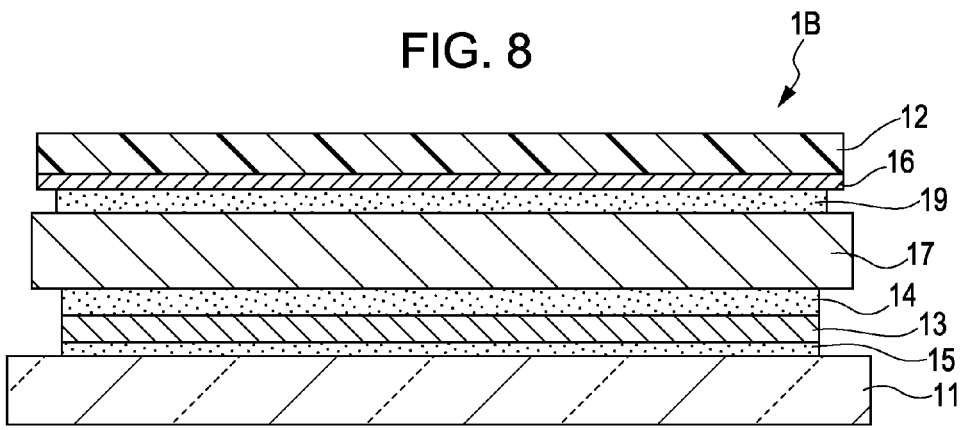
FIG. 8 is a diagram showing another example of a structure of a liquid crystal display device incorporating a touch-sensitive panel.
Figure 9:
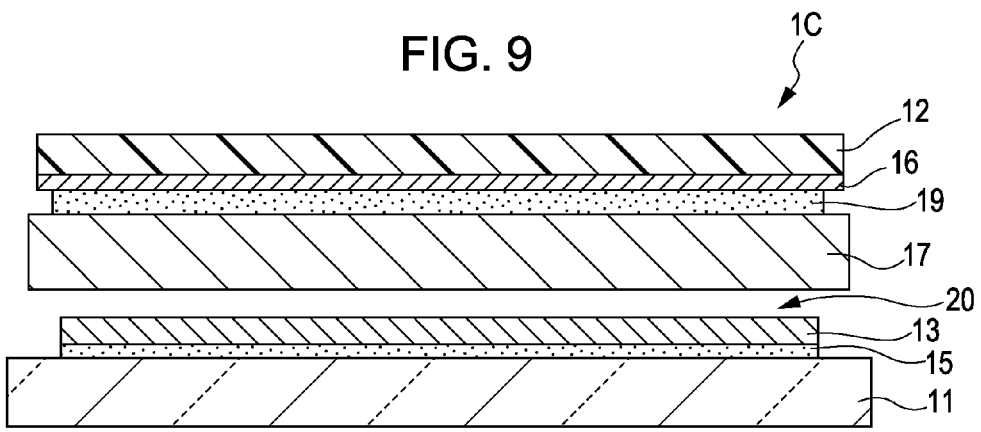
FIG. 9 is a diagram showing yet another example of a structure of a liquid crystal display device incorporating a touch-sensitive panel.

The liquid crystal display device may be provided with a touch-sensitive panel. FIGS. 7 to 9 are cross-sectional views each showing a structure of a liquid crystal display device with a touch-sensitive panel. In this device, a cover (protective member) is disposed at the viewer's side of the touch-sensitive panel. The touch-sensitive panel is, for example, a capacitive sensing-type panel.

A liquid crystal display device 1A shown in FIG. 7 includes a touch-sensitive panel 17 bonded to the display-panel-11-side surface of the polarizer 13 shown in FIG. 1 by using the transparent adhesive 15, and a space 18 of an appropriate dimension is provided between the touch-sensitive panel 17 and the display panel 11.

A liquid crystal display device 1B shown in FIG. 8 includes the touch-sensitive panel 17 bonded to the cover-12-side of the polarizer 13 shown in FIG. 1 by using the transparent adhesive 14, and another adhesive 19 is provided at the cover-12-side of the touch-sensitive panel 17 so that the touch-sensitive panel 17 is bonded to the cover 12 with the adhesive 19. In this structure, the gas barrier film 16 is disposed between the cover 12 and the adhesive 19.

A liquid crystal display device 1C shown in FIG. 9 includes the touch-sensitive panel 17 at the cover-12-side of the polarizer 13 shown in FIG. 1 while a space 20 of an appropriate dimension is formed between the touch-sensitive panel 17 and the polarizer 13. The adhesive 19 is provided at the cover-12-side of the touch-sensitive panel 17 so that the touch-sensitive panel 17 is bonded to the cover 12 with the adhesive 19. In this structure, the gas barrier film 16 is disposed between the cover 12 and the adhesive 19.

As described above, in the liquid crystal display devices shown in FIGS. 7 to 9, release of gas from the cover 12 is also prevented by the gas barrier film 16.

The electro-optic device can also be applied to various other liquid crystal display devices, electroluminescence devices, organic electroluminescence devices, plasma display devices, electrophoretic display devices, and devices incorporating emission elements (e.g., field emission display devices and surface-conduction electron emission display devices).

Figure 10:
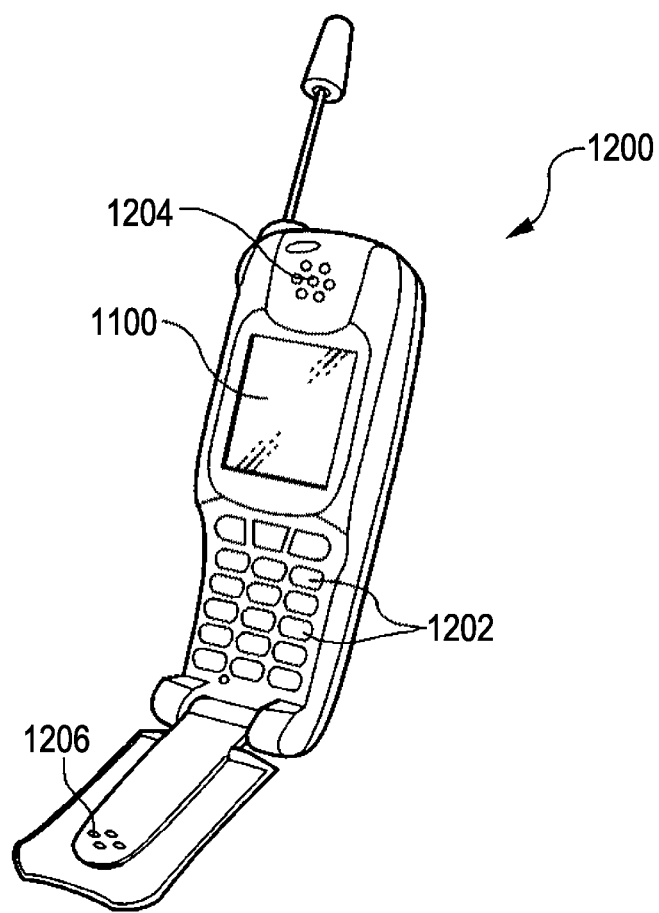
FIG. 10 is a perspective view showing an appearance of a cellular phone, which is one example of an electronic apparatus.

Electronic apparatuses including the liquid crystal display devices described above will now be described. FIG. 10 is a perspective view showing the appearance of a cellular phone as an example of the electronic apparatus. As shown in FIG. 10, a cellular phone 1200 includes a plurality of operation pads 1202, an earpiece 1204, a mouthpiece 1206, and a display unit 1100 including a liquid crystal display device 1 as the electro-optic device.

Other examples of the electronic apparatuses to which the electro-optic device can be applied include personal digital assistants (PDAs), portable personal computers, digital cameras, automobile monitors, digital video cameras, liquid crystal televisions, view finder-type or direct-view-type video recorders, car navigation systems, pagers, electronic notebooks, calculators, word processors, work stations, video phones, and POS terminals.

The invention is not limited to the embodiments described above and various modifications and alterations are possible without departing from the spirit of the invention.

What is claimed is:

1. An electro-optic device comprising:
an electro-optic panel;
a transparent protective member disposed at a viewer side of the electro-optic panel, the transparent protective member being composed of plastic;
a polarizer provided between the electro-optic panel and the transparent protective member;
a first adhesive having a thickness ranging from 25 μm to 50 μm and provided between the electro-optic panel and the polarizer;
a gas barrier layer that is provided at a side opposite to the viewer side of the transparent protective member, and disposed in direct contact with the transparent protective member, wherein the gas barrier layer includes a three-layered inorganic film in which an $Al_2O_3$ layer having a thickness ranging from 25 nm to 45 nm directly contacting the transparent protective member, a SiO layer having a thickness ranging from 15 nm to 45 nm, and a $SiO_2$ layer having a thickness ranging from 100 nm to 150 nm are laminated in this order; and
a second adhesive having a thickness ranging from greater than 25 μm to 400 μm and provided between the gas barrier layer and the polarizer, the second adhesive having a thickness greater than that of the first adhesive,
wherein the $SiO_2$ layer directly contacts the second adhesive.

2. The electro-optic device according to claim 1, further comprising a touch-sensitive panel provided between the electro-optic panel and the gas barrier layer.

3. An electronic apparatus comprising the electro-optic device according to claim 1.

* * * * *